US012223317B2

(12) United States Patent
McCarthy

(10) Patent No.: US 12,223,317 B2
(45) Date of Patent: Feb. 11, 2025

(54) AUTOMATING CREATION OF MULTIPLE SIMULTANEOUS SOFTWARE DEVELOPMENT ENVIRONMENTS ON A COMPUTER SYSTEM

(71) Applicant: Dell Products, L.P., Hopkinton, MA (US)

(72) Inventor: Jason McCarthy, Cambridge, MA (US)

(73) Assignee: Dell Products, L.P., Hopkinton, MA (US)

(\*) Notice: Subject to any disclaimer, the term of this patent is extended or adjusted under 35 U.S.C. 154(b) by 311 days.

(21) Appl. No.: 17/947,097

(22) Filed: Sep. 17, 2022

(65) Prior Publication Data

US 2024/0095028 A1   Mar. 21, 2024

(51) Int. Cl.
*G06F 8/77* (2018.01)

(52) U.S. Cl.
CPC ........................... *G06F 8/77* (2013.01)

(58) Field of Classification Search
None
See application file for complete search history.

(56) References Cited

U.S. PATENT DOCUMENTS

| | | | | |
|---|---|---|---|---|
| 10,459,823 | B1* | 10/2019 | Lieberman | G06F 11/362 |
| 2014/0059519 | A1* | 2/2014 | Bhogal | G06F 9/44505 |
| | | | | 717/121 |
| 2016/0077820 | A1* | 3/2016 | Bergen | G06F 8/61 |
| | | | | 717/176 |
| 2017/0142203 | A1* | 5/2017 | Zhang | G06F 8/60 |
| 2018/0137032 | A1* | 5/2018 | Tannous | G06F 9/45558 |
| 2018/0157592 | A1* | 6/2018 | Ivanov | G06F 12/0875 |
| 2018/0288129 | A1* | 10/2018 | Joshi | H04L 43/20 |
| 2020/0082094 | A1* | 3/2020 | Mcallister | G06F 8/77 |
| 2021/0103441 | A1* | 4/2021 | Jain | G06F 9/45558 |

OTHER PUBLICATIONS

A. Šimec, B. Držanić and D. Lozić, "Isolated Environment Tools for Software Development," 2018 International Conference on Applied Mathematics & Computer Science (ICAMCS), Paris, France, 2018, pp. 48-484. (Year: 2018).*

* cited by examiner

*Primary Examiner* — Andrew M. Lyons
(74) *Attorney, Agent, or Firm* — Anderson Gorecki LLP

(57) ABSTRACT

A method and apparatus for automating creation of multiple simultaneous software development environments on a development machine is provided. Automation code, for example implemented using Python script, reads a text file such as a JSON file describing the development environment to be created. The automation code is configured to locate (locally or in a software repository) and download the supporting software identified in the text file and required to be included in the development environment. The automation code is also configured to determine a set of ports used by the supporting software to communicate with the development machine, and to search for a set of available ports on the development machine that are available and able to be mapped to the development environment. The automation code modifies supporting software configuration files to reflect the port assignments and builds a container including the software code and associated configuration files.

20 Claims, 4 Drawing Sheets

AUTOMATING CREATION OF MULTIPLE SIMULTANEOUS SOFTWARE DEVELOPMENT ENVIRONMENTS ON A COMPUTER SYSTEM

FIELD

This disclosure relates to computing systems and related devices and methods, and, more particularly, to a method and apparatus for automating creation of multiple simultaneous software development environments on a computer system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for automating creation of multiple simultaneous software development environments on a computer system such as a development machine is provided. Automation code, for example implemented using Python script, reads a text file such as a JSON file describing the development environment to be created. The automation code is configured to locate (locally or in a software repository) the supporting software identified in the text file and required to be included in the development environment. The automation code is also configured to determine a set of ports used by the supporting software to communicate with the development machine, and to search for a set of ports on the development machine that are available and able to be mapped to the development environment. The automation code modifies supporting software configuration files to reflect the port assignments and builds a container including the software code and associated configuration files. File systems and libraries required by the development environment are mounted to the container by the automation code, and the port assignments are exposed by the container to enable the development environment to be accessed from the development machine. In some embodiments the containers are Docker containers that are built by the automation code based on Dockerfiles generated from configuration information identified in the text files. By containerizing development environments, and providing an automated way of creating multiple development environments on a given development machine while avoiding port/resource conflicts, it becomes possible to easily switch between development environments which require different versions of support software, particularly where the different versions of the support software within the development environments are required to be accessed at the development machine level (e.g. to provide PostgreSQL database access, JBoss application server, debugger ports, etc.).

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
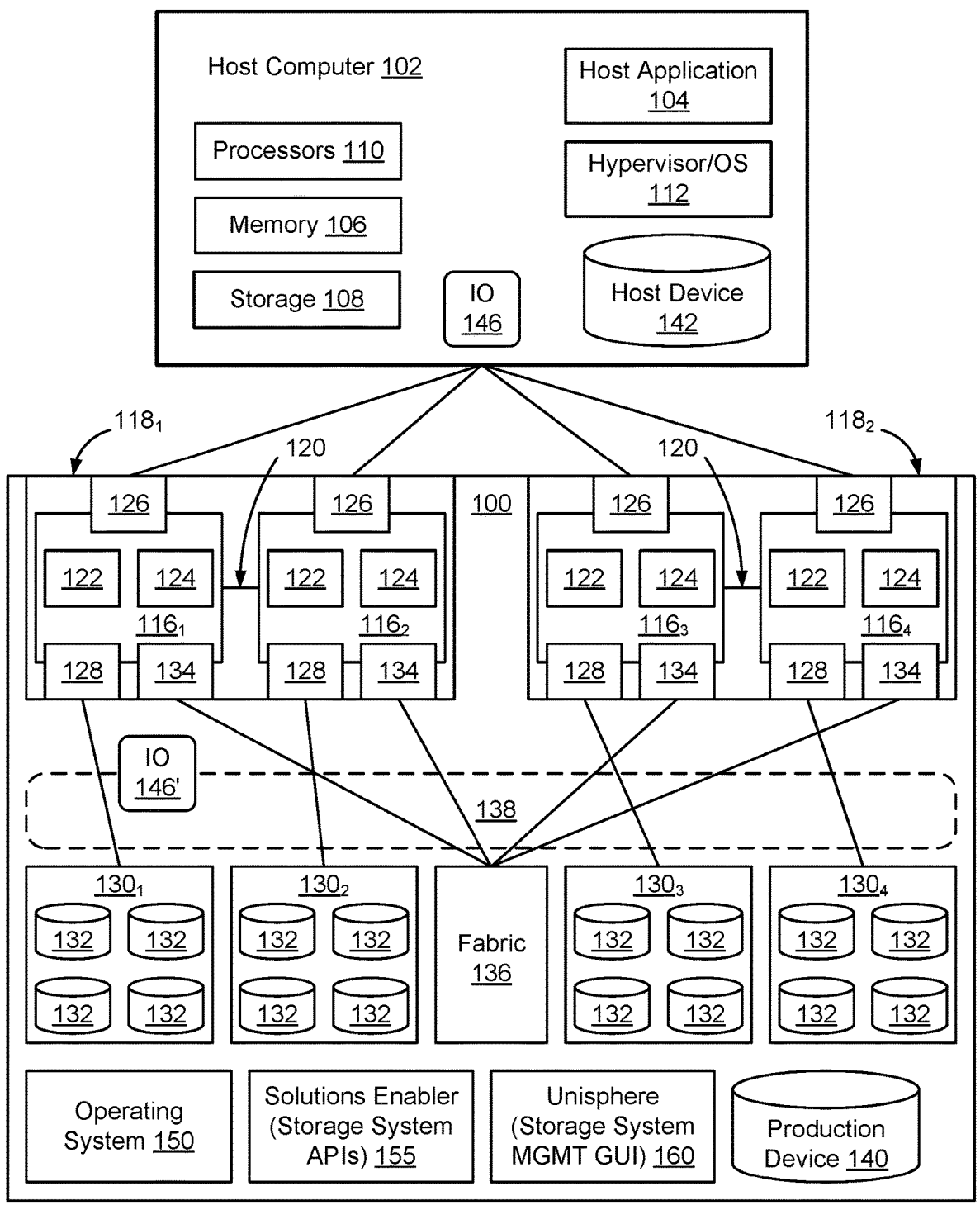
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

As is clear from the description of FIG. 1, storage systems such as the storage system 100 are complex systems that involve multiple hardware components and multiple software applications that execute on the storage system to provide access to the storage resources of the storage system 100 and to protect data maintained by the storage system 100. In some embodiments, a set of Application Programming Interfaces (APIs) 155 are used to enable a management system 160 to interact with the storage system and configure the underlying storage system. An example software application that has been developed that provides a set of APIs to interface with storage systems from Dell™ is referred to herein as Solutions Enabler. An example storage system management application that has been developed to interact with storage systems from Dell™ is referred to herein as Unisphere. Although some embodiments will be described in which both Solutions Enabler and Unisphere are described as being included as supporting software to be included in several example development environments, it should be understood that other supporting software applications such as collections of APIs and storage system management applications may similarly be used.

Some software developers work to create new features for future software releases, for example to develop new features that may be included in the software running on storage system 100. Example software releases might include enhancements to the set of APIs used to interact with the storage system, new features of the storage system management application, bug fixes, and other types of changes to the underlying software. To do this, a given development environment is created on the developer's machine (e.g. laptop computer) to enable the developer to have work on the particular feature in the context of the development environment. The development environment includes a set of software applications that rely on a technology stack with a particular version of supporting software. For example, if a new feature is to be created for a software release for a particular storage system 100, the most recent version of the supporting applications (e.g., Unisphere and Solutions Enabler) will be loaded to the developer's machine to provide a development environment in which the feature can be created, tested, etc.

It is therefore customary for the developer to have a primary development machine that is created and reused for all work on a current software release. Specific versions of Java, Solutions Enabler, IntelliJ (a development environment for developing software written in Java), PostgreSQL, and other supporting software applications required by the programmer to work on particular features are downloaded and installed on the primary development machine, to create a development environment that the developer can use to work on the most recent software release.

One of the issues for developers is that, if a customer has an issue that needs resolution, the developer will need to switch from the developer's current development environment to a new development environment. For example, if the developer is working on a new feature using version 10.1.1 of Unisphere and version 3.2.33 of Solutions Enabler, and the customer is using version 9.2.3 of Unisphere and version 2.9.89 of Solutions Enabler, the developer will need to create a new development environment based on the versions of the software in use by the customer and the particular technology stack being used by those software versions, prior to beginning work to determine the cause of the customer's issue and a possible resolution of the customer's issue. Without creating a development environment that matches the customer's operating environment, it is often not possible to recreate the issue that the customer was experiencing and, hence, not straightforward to determine a fix for the issue.

Accordingly, if the developer is working on the most recent software release, and a customer issue comes in, the developer will need to either build out a virtual machine from scratch, with the correct version of Java, Solutions Enabler Software Development Kit (SDK), source code, debugging software (IDE), etc., in use by the customer, or tear down the developer's current development environment and reinstall the particular versions that the customer is using.

Unfortunately, there is a significant time cost to this type of context switching. Locating, downloading, and installing software is a mostly manual process. Once that is handled, a full build of Unisphere on Windows can take over an hour. Further, if a new Virtual Machine (VM) is to be used to implement the customer specific development environment, the new VM will need to be located or requested, and all the required software still needs to be identified, downloaded, and installed, and the code needs to be built.

According to some embodiments, a method and apparatus for automating creation of multiple simultaneous software development environments on a computer system such as a development machine is provided. Automation code, for example implemented using Python script, reads a text file such as a JSON file describing the development environment to be created. The automation code is configured to locate (locally or in a software repository) the supporting software identified in the text file and required to be included in the development environment. The automation code is also configured to determine a set of ports used by the supporting software to communicate with the development machine, and to search for a set of available ports on the development machine that are available and able to be mapped to the development environment. The automation code modifies supporting software configuration files to reflect the port assignments and builds a container including the software code and associated configuration files. File systems and libraries required by the development environment are mounted to the container by the automation code, and the port assignments are exposed by the container to enable the development environment to be accessed from the development machine.

In some embodiments the containers are Docker containers that are built by the automation code based on Dockerfiles identified in the text files. By containerizing development environments, and providing an automated way of creating multiple development environments on a given development machine, it becomes possible to easily switch between development environments which require different versions of support software, particular where the different versions of the support software within the development environments are required to be accessed at the development machine level (e.g. to provide PostgreSQL database access, JBoss application server, debugger ports, etc.). Although some embodiments will be described herein in which the containers that are created are Docker containers, it should be understood that other forms of containers may be used as well, depending on the implementation. For example, Kubernetes provides an open-source container orchestration system for automating software deployment, scaling, and management and may be used, in some embodiments, instead of the Docker containers described in greater detail herein.

Figure 2:
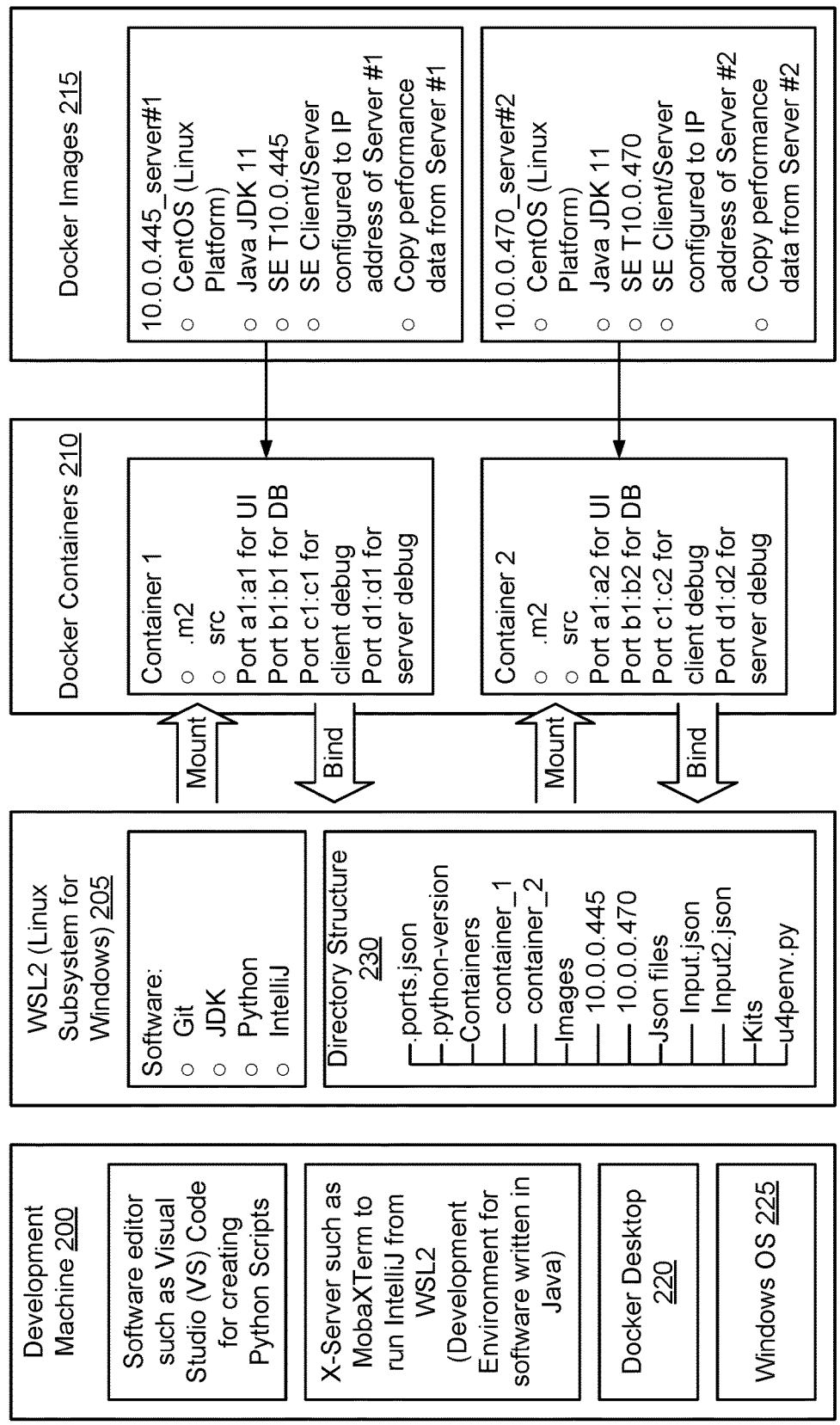
FIG. 2 is a functional block diagram of an example system configured to enable automated creation of multiple simultaneous software development environments on a computer system, according to some embodiments.

FIG. 2 is a functional block diagram of an example system configured to enable automated creation of multiple simultaneous software development environments on a computer system, according to some embodiments. Although some examples described herein are described as including particular software components, it should be understood that the solution described herein can be used to concurrently develop (from a single development machine) any type of software application where different versions of that software application use a technology stack with different versions of support software, especially if the supporting software needs to be accessed at the development machine level, e.g. PostgreSQL database access, JBoss application server, debugger ports, etc. Accordingly, although some examples are described in which the software development environments that are created are configured to contain particular components such as particular versions of Java, Solutions Enabler, and Unisphere, it should be understood that the system for automating creation of software environments described herein can similarly be used to create other development environments with different software components.

As shown in FIG. 2, in some embodiments the example system includes a development machine 200. An example development machine 200 might be a laptop or desktop computer running a Windows™ operating system. In some embodiments, the developer machine might include various software development tools such as Visual Studio (VS) Code, which is a source code editor that can be used for example to create various Python scripts. Likewise, in some embodiments the developer machine 200 includes software configured to implement an X-Server, such as MobaXTerm which is a free X-Server for Windows.

As shown in FIG. 2, in some embodiments the development machine 200 includes Windows Subsystem for Linux (WSL2) 205 implemented as a compatibility layer for running Linux binary executables natively on several versions of the Windows operating system, such as on Windows 10. Example Linux binary executables might include Git (interface software to the git software repository), JDK (Java Development Kit), Python (high-level interpreted general-purpose programming language), and IntelliJ (a software development environment designed to developing software written in Java). In some embodiments the X-server is used to run IntelliJ from the WSL2 layer.

As shown in FIG. 2, in some embodiments the development machine 200 includes an instance of Docker Desktop 220, which may require the WSL2 205 to execute on the development machine. Docker Desktop 220, in some instances, supports creation of Docker containers. As used herein, the term container is used to refer to a discrete environment set up within an operating system in which one or more applications may be run. Typically, a container is assigned only those resources necessary for the application to function properly. A container includes the software, libraries, and set of configuration files to enable the software to execute in the context of the operating system.

According to some embodiments, automation code is used to automatically create development environments inside Docker containers, in which each Docker container is able to be created to include a particular version of Java JDK, Solutions Enabler, Unisphere, and other supporting software applications required to implement the unique development environment.

Some supporting software applications that are configured to be accessed at the development machine level are required to communicate with the development machine over particular ports. Where multiple development environments are simultaneously extant on a given development machine, the supporting software in each development environment will need to communicate with the given development machine using the same set of ports. However, ports on the development machine are uniquely assigned to Docker containers and, hence, only one Docker container of a set of Docker containers can physically communicate with the development machine using the set of ports used by the supporting software in the development environment.

To enable the multiple development environments to execute on a given development machine 200, the automation code is configured to identify sets of free ports on the development machine and map the identified sets of free ports on the development machine to the respective ports used by the supporting software in the development environments. The automation code also automatically modifies a set of configuration files within the Docker container based on the port mapping. In this manner the subsystems on the development machine, such as the UI port, the DB port, and the debug ports, all are the same within each Docker container and are able to be used by the supporting software within each created development environment to enable the supporting software to be accessed at the development machine level in the development environment. However, the development machine sees each Docker container as having different port assignments, thus enabling the development machine to differentiate between the different development environments, and enabling a user of the development machine to dynamically switch between development environments.

In some embodiments, the WSL2 layer 205 supports a Linux kernel, which has a directory structure 230. The directory structure includes entries that contain various executables such as the .python-version, JSON files, software kits, etc. As containers are created they are added to the directory structure. Similarly, JSON files, as created, are added to the directory structure. In FIG. 2, there are two containers 210 labeled container 1 and container 2. Each container is based on a particular Docker image 215 that specifies the software that is to be included in the Docker container when the Docker container is created. For example, Docker container 1 is based on a Docker image created using the 10.0.0.445_server#1.dockerfile. This Docker image specifies the use of CentOS (Linux platform), Java Development Kit (JDK) 11, and Solutions Enabler version T10.0.0.445. The Docker image also specifies that the Solutions Enabler client/server be configured to IP address of server #1, and that the performance data should be copied from server #1. Docker container 2 is based on a Docker image created using the 10.0.0.470_server #2.dockerfile, and is similar to Docker container 1, except that Docker container 2 includes Solutions Enabler version T10.0.0.470 instead of Solutions Enabler version T10.0.0.445, and specifies that the Solutions Enabler client/server should be configured to the IP address of server #2 and that performance data should be copied from server #2.

In both instances, when the Docker container is created, one or more directories are mounted to the Docker container from the directory structure to enable the Docker container to read/write to those volumes. For example, in some embodiment a filesystem .src is mounted to the docker container, and the filesystem .m2 (third party libraries) is mounted to the Docker container. As discussed in greater detail in connection with FIG. 3, a port election process is used to search for open ports that will enable the supporting software of the development environment to be accessed at the development machine level. Once available ports have been determined, the configuration files of the Docker container are automatically modified by the automation code to incorporate the port assignments, and the Docker container binds the determined host ports to the ports used by the supporting software within the development environment.

For example, as shown in FIG. 2, container 1 is the first container created on the system, and accordingly ports a1, b1, c1, and d1 are all available on the host for use by the container. Accordingly, container 1 will bind container port a1 to host port a1, will bind container port b1 to host port b1, will bind container port c1 to host port c1, and will bind container port d1 to host port d1. For example, in an instance where port 8443 is used for UI, container port a1=8443 will be bound to host port a1=8443. Similarly, port 3324 might be used for database access, port 3000 for client debug operations, and port 41873 for server debug operations. Since container 1 is the first container created on the development machine 200, these ports are available on the host 200 and, as such, the same port numbers on the Docker container are able to bind to these ports on the host.

However, when docker container 2 is created, ports a1, b1, c1, and d1 have all been bound to Docker container 1 and, as such, are in use and not available for use by Docker container 2. According to some embodiments, when Docker container 2 is created, automation code identifies a set of free ports on the host system (a2, b2, c2, d2) and binds these ports to the docker container. The automation code modifies configuration files associated with Solutions Enabler, Unisphere, PostgreSQL, IntelliJ, etc., to reflect this collection of ports on the development machine 200.

Further, the automation code in some embodiments is configured to automatically download and instore the correct instance of the software identified in the Docker image, for example from the REST APIs of one or more software repositories, to thus automate the process of creating development environments on the development machine. For example, if a development environment is to be created to work on a particular feature branch, the automation code in some embodiments is configured to create the feature branch in git, checkout the feature branch, and include the feature branch in the development environment thus automating the entire process of both creating the development environment and obtaining a copy of the source code to be worked on within the development environment.

Figure 3:
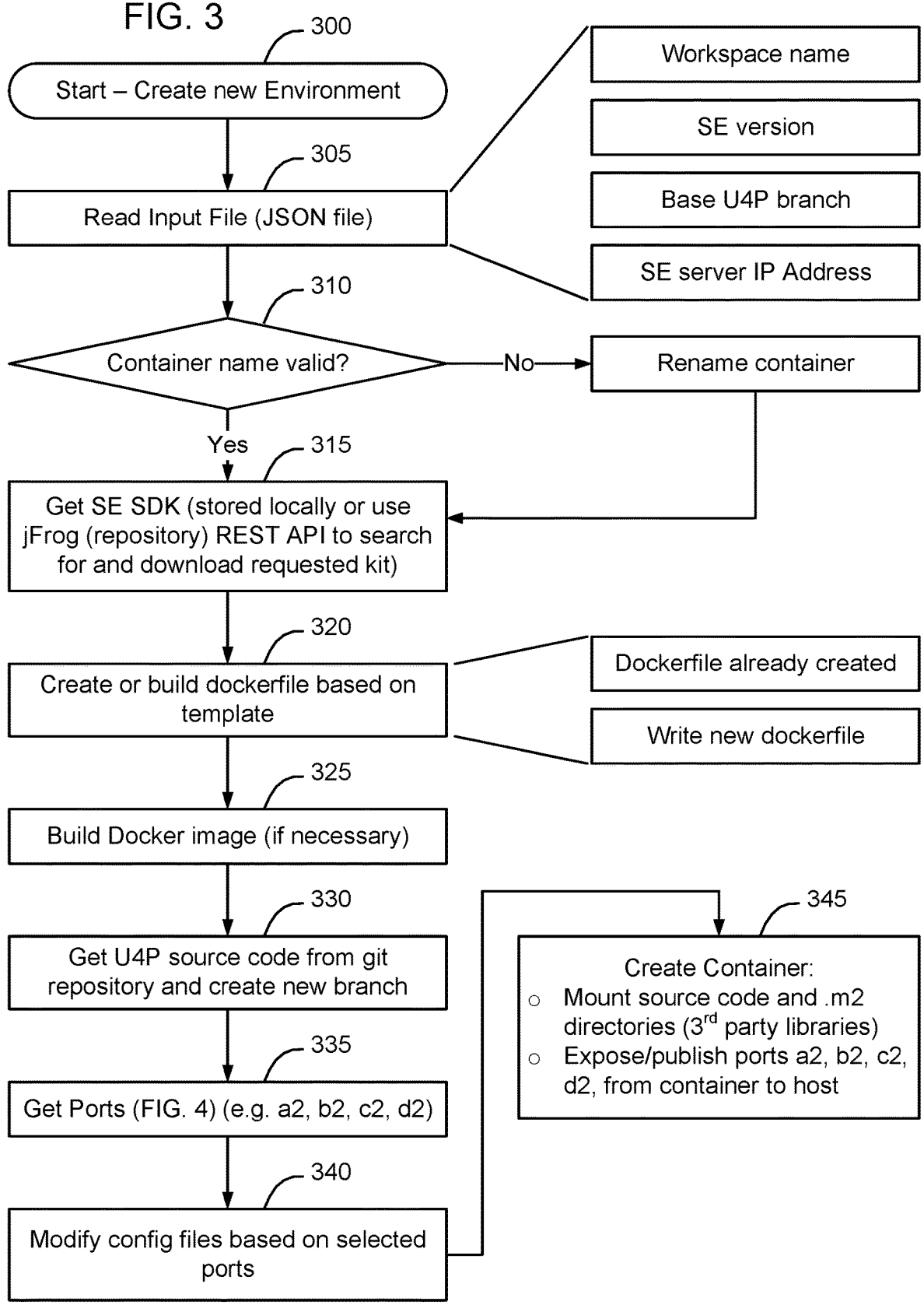
FIG. 3 is a flow chart of a process configured to enable automated creation of multiple simultaneous software development environments on a computer system, according to some embodiments.

FIG. 3 is a flow chart of a process configured to enable automated creation of multiple simultaneous software development environments on a computer system, according to some embodiments. In some embodiments, a Python script is used to implement automation code to create the development environment. As shown in FIG. 3, when a new development environment is to be created (block 300) the Python script reads a JSON (JavaScript Object Notation) file (block 305) defining the development environment that is to be created on the development machine 200. For example, in FIG. 2 the directory structure 230 includes two JSON files titled "Input.json" and "Input2.json". In some embodiments, the JSON file includes the workspace name, the version of Solutions Enabler that should be included in the development environment, the branch of Unisphere that should be loaded to the development environment, and the Solutions Enabler server IP address. The JSON file may be implemented, for example, as a text file containing these aspects. Where the development environment is to include additional or alternative pieces of software, or software versions, the JSON file may similarly include additional or different entries identifying the additional or alternative software instances that should be loaded to the development environment.

The automation code then does a check to ensure that the container name (which is based on the workspace name) is valid within the development machine (block 310). In some embodiments, the container name must be unique within the directory structure 230 of the WSL2 layer 205. If the workspace name is not unique and will result in creation of a container with the same name as another currently running container (a determination of NO at block 310), in some embodiments the workspace/container is renamed, or the user is prompted to rename the container, or the process fails.

If the container name is unique (a determination of YES at block 310) or after the container is renamed, the automation code continues to start to build the software identified in the JSON file. For example, in some embodiments the automation code retrieves the Solutions Enabler (SE) SDK identified by the Solutions Enabler version of the JSON file (block 315). The SE SDK may be stored locally on the development machine 230, for example in a filesystem referenced in the directory structure 230. Alternatively, if the SE SDK is not stored locally, in some embodiments the automation code uses a REST (Representational State Transfer) API of a repository where the SE SDK is stored to search for and download the correct version of the SE SDK. Example software repositories include jFrog, git, etc. Other software repositories or privately maintained software repositories may be used as well, depending on the implementation. In some embodiments, the automation code is configured to search for and download the most official version of the SE SDK available in the software repository.

The automation code then builds a Dockerfile (block 320) for the Docker container. A Dockerfile is a text document that contains all the commands that need to be called on a command line to assemble a Docker image. A Dockerfile may have already been created and can be reused by the automation code. Alternatively, a new Dockerfile may be created based a template. The Docker Desktop 220 can build Docker images automatically by reading instructions from the Dockerfile. In some embodiments, the automation code uses the Docker command "docker build" to instruct the Docker Desktop 220 to create an automated build that executes the command-line instructions of the Dockerfile in succession. For example, in some embodiments the "docker build" command uses the Dockerfile of block 320 and a build context to build an image to be used to create the development environment within the container (block 325). The build context is the set of files at a specified location, which is either a path on the local filesystem 230 or a URL to a software repository such as Git or jFrog. For example, in FIG. 3 it is assumed that the Docker image should include a copy of Unisphere (U4P) that is available in the Git software repository. Accordingly, as shown in FIG. 3, part of the context of the image includes a URL of the REST API of the Git software repository that enables the correct version of Unisphere to be added to the Docker image. For example, the automation code may issue the following series of git commands:

git checkout <u4p_branch_name> (checks out particular u4p branch)
    git branch /usr/<nt_username>/<environment_name> (creates new branch)
    git checkout/usr/<nt_usemame>/<environment_name> (checks out the newly created branch)

Although FIG. 3 shows a particular set of steps that are taken by the automation code to build a particular Docker image for the Docker container, it should be understood that other Docker images may similarly be built with different collections of software by the automation code, as specified in the JSON file.

The automation code also proceeds to identify a set of ports on the host (development machine 200) for use by the Docker container. In some embodiments, the supporting software components of the development environment may need to be accessed at the development machine level using a particular set of communication ports. For example, the Unisphere User Interface (UI) between the Docker container and host may be accessed on port 8443, database access may use port 3324, local debug operations may use port 3000, and server debug operations may use port 41873. Other implementations may use other port numbers, and these port numbers are simply used as an example to describe a particular instance of an implementation. Although FIG. 3 shows the process of identifying a set of ports (block 335) as occurring after the Docker image has been built, it should be understood that the port selection process of block 335 may occur earlier in the process of creating the development environment. For example, after reading the JSON file, the automation code may initiate the process of identifying a set of ports to be used to communicate between the development machine and the Docker container. Accordingly, it should be understood that the timing of when the automation code determines the set of ports for use by the development environment it is creating will depend on the particular implementation.

Figure 4:
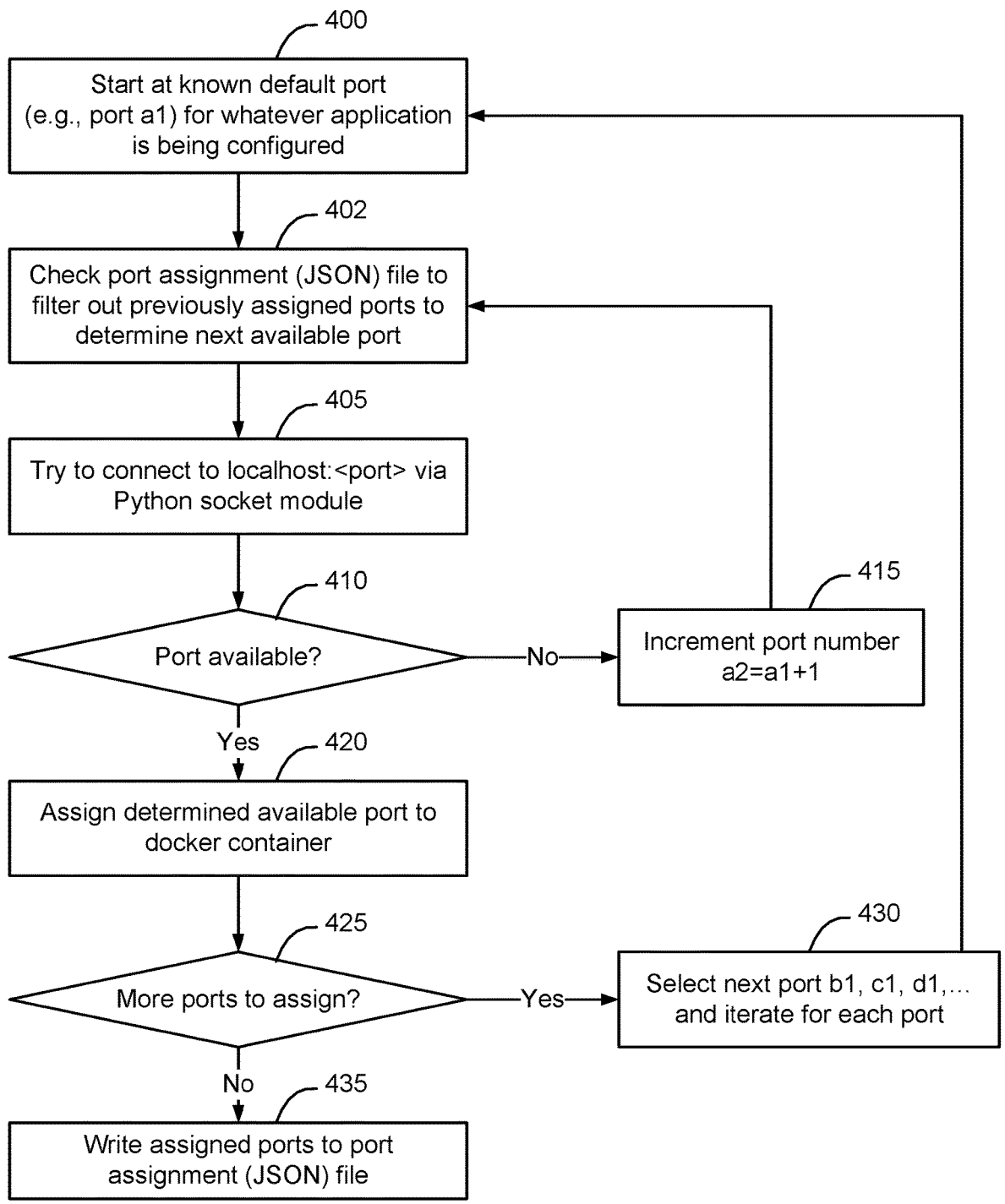
FIG. 4 is a flow chart of an example process of assigning ports of a development machine to supporting software of a development environment, in connection with automated creation of the software development, according to some embodiments

FIG. 4 is a flow chart of an example process of assigning ports of a development machine to supporting software of a development environment, in connection with automated creation of the software development, according to some embodiments. As shown in FIG. 4, in some embodiments the automation code will attempt to locate a set of available ports on the development machine that are numerically relatively close to the default ports used by the supporting software within the development environment. For example, if one aspect of the supporting software in the development environment is accessed at the development machine level using default port value a1, in some embodiments the automation code will try to locate a port relatively close to the default port value a1. In some embodiments, as shown in FIG. 4, the port selection process checks a port assignment file to filter out previously assigned ports to determine a next available port (block 402). The port assignment file, in some embodiments, is implemented as a JSON file that contains a list of ports that have previously been reserved by the automation code for use by other containers, and prevents conflicts between port assignments between containers. For example, if a container is down, any ports assigned to the container become technically available in the Python Sockets library on the development host. By checking port assignment file to filter out previously assigned ports, it is possible to avoid assigning the same port to multiple containers.

Once an available port is determined, the process will attempt to connect to the selected port on the development machine 200, for example using the Python socket module (block 405). For example, if port a1 is available, the automation code will attempt to connect to port a1 on the development machine 200. If the connection is successful, port a1 is available (a determination of YES at block 410) and port a1 is assigned to the docker container (block 420). If the automation code can't connect to port a1 on the development machine 200 (a determination of NO at block 410), port a1 has been previously assigned to another docker container, assigned to another process on development machine 200, or is otherwise in use on the development machine 200. Accordingly, the automation code will increment the port number a2=a1+1 (block 415) and try to connect to port a2 on the development machine 200 using the Python socket module (block 405). The process iterates until an available port on the development machine 200 is located, and the determined free port is assigned to docker container (block 420).

A determination is then made if there are additional ports to be assigned to the supporting software in the development environment (block 425). Some containers may require only one port, some may require multiple ports. Accordingly, if the automation code determines that more than one port is required to be assigned to the development environment (a determination of YES at block 425) the automation code process to select the next port, e.g. b1, b2, b3, . . . , and iterates the process of blocks 405-420 for each port c1, d1, e1, . . . , until a set of required free ports has been determined on the development machine 200. Once all required free ports have been determined (a determination of NO at block 425), the automation code writes the assigned ports to the port assignment (JSON) file. It should be noted that the port assignment (JSON) file that is updated in block 435 is the same port assignment file that was consulted by the automation code in block 402.

Once the required free ports have been determined, a set of configuration files required by the container are modified to reflect the port assignment (block 340). For example, in some embodiments in which IntelliJ is used as a debugging environment, the configuration file intellij/.idea/workspace.xml is updated to reflect the selected port that will be used for server debug traffic.

As another example, to enable copy mode for performance data, the file wlp/wlpejb/src/main/resources/META-INF/ejb-jar.xml is modified to enable copy mode and set the remote server IP. In some embodiments the automation code (Python script) is configured to implement this modification.

The domain/symmetrix/ejb/src/main/resources/META-INF/ejb-jar.xml is also modified to set up the SE client/server, for example to specify the IP address of the SE server.

To enable client debugging, the jsclient/package.json file is modified to replace the ng server with a ng server address of the host 0.0.0.0.

To enable server debugging, the default port value of the server d1 (e.g. port 41873) is replaced with the port value (e.g. *:41873) identified using the process described in connection with FIG. 4. For example, this may include modifying the jboss-overrides/domain/configuration/domain.xml.init file.

To enable database access, the automation code modifies the install_dist/scripts/database/postgresql.conf file to replace the default port value b1 (e.g. port 3324) with the port value (e.g. *:3324) identified using the process described in connection with FIG. 4.

In some embodiments, the automation code also modifies the jsclient/IDEA/jsclient.iws file to set the Apache maven paths to the \\wsl$ directories 230 and to set the debugger port, to replace the default debugger port value c1 (e.g. port 3000) with the port value (e.g. *:3000) identified using the process described in connection with FIG. 4.

It should be understood that the particular configuration files that are required to be configured depend on the particular supporting software used to implement the software development environment that is to be created. For example, if the development environment does not require access to PostgreSQL, the automation script would not need to modify the config file associated with database access. Thus, the particular set of configuration files described herein is provided as an example to provide context to the types of operations that may be implemented by the automation code depending on the implementation.

Once the ports are assigned (block 335), and the configuration files have been modified (block 340), the automation code proceeds to create the container (block 345). In connection with creating the container, the workspace appropriate source code and .m2 directories (third party libraries required by the source code) are mounted from WSL2 205 to the container, and the ports identified using the process described in connection with FIG. 4 are exposed/published from the container to the host.

Once the container has been created, it is possible to connect to the container, build the code within the container, and run the code to complete creation of the development environment. The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of automating creation of multiple simultaneous software development environments on a single physical development machine, each development environment including a respective version of a software application to be developed and a respective supporting technology stack including a respective version of one or more supporting software applications, comprising:

using automation code to automatically create a respective container on the development machine for each of the multiple simultaneous software development environments, each container being implemented as a discrete environment set up within an operating system of the development machine, each container including the respective version of the software application to be developed and the respective supporting technology stack including the respective version of the one or more supporting software applications;

wherein using the automation code to automatically create each of the respective containers comprises, for each respective container:

reading a text file describing the development environment to be created, the text file identifying the respective version of the one or more supporting software applications to be used to implement the development environment;

locating and downloading the respective version of the one or more supporting software applications identified in the text file and required to be included in the development environment;

determining a first set of one or more ports used to access the supporting software applications within the development environment at the development machine level;

identifying a second set of ports on the development machine;

correlating the second set of ports on the development machine with the first set of one or more ports used to access the supporting software applications within the development environment at the development machine level;

modifying a set of configuration files associated with the supporting software applications based on the correlation between the second set of ports and first set of one or more ports;

building a container containing the respective version of the software application to be developed and the respective supporting technology stack including the respective version of one or more supporting software applications supporting software instance to create the development environment; and binding the second set of ports to the created container.

2. The method of claim 1, wherein the first set of one or more ports are default ports used by the respective versions of the one or more supporting software applications of each of the respective containers, and are the same on each of the respective containers.

3. The method of claim 2, wherein identifying the second set of ports comprises reading a file containing a list of ports that have been reserved for use by other containers; and determining a first set of free ports that have not been reserved for use by other containers.

4. The method of claim 3, wherein identifying the second set of ports further comprises:

attempting to connect to the determined first set of free ports on the development machine; and setting the second set of ports to be the determined first set of free ports when the attempt to connect to the determined first set of free ports is successful.

5. The method of claim 4, further comprising updating the file containing the list of ports that have been reserved by other containers with information identifying the second set of ports.

6. The method of claim 4, further comprising determining a second set of free ports that have not been reserved for use by other containers when the attempt to connect to the determined first set of free ports is not successful.

7. The method of claim 1, wherein locating and downloading the respective version of the one or more supporting software applications identified in the text file and required to be included in the development environment comprises determining whether the respective version of the one or more supporting software applications is stored locally on the development machine.

8. The method of claim 7, wherein, in response to a determination that respective version of the one or more supporting software applications is not stored locally on the development machine, the method further comprising:
automatically searching for respective version of the one or more supporting software applications on a REST API of a software repository; and
downloading the respective version of the one or more supporting software applications from the software repository.

9. The method of claim 1, wherein binding the second set of ports to the created container comprises publishing the second set of ports from the container to the development machine.

10. The method of claim 1, further comprising retrieving source code of the respective version of the software application to be developed from a software repository that is to be modified in the development environment; and
including the source code in the container.

11. A non-transitory tangible computer readable storage medium having stored thereon a computer program for automating creation of multiple simultaneous software development environments on a single physical development machine, each development environment including a respective version of a software application to be developed and a respective supporting technology stack including a respective version of one or more supporting software applications, the computer program including a set of instructions which, when executed by a computer, cause the computer to perform a method comprising the steps of:
using automation code to automatically create a respective container on the development machine for each of the multiple simultaneous software development environments, each container being implemented as a discrete environment set up within an operating system of the development machine, each container including the respective version of the software application to be developed and the respective supporting technology stack including the respective version of the one or more supporting software applications:
wherein using the automation code to automatically create each of the respective containers comprises, for each respective container:
reading a text file describing the development environment to be created, the text file identifying respective version of the one or more supporting software applications to be used to implement the development environment;
locating and downloading the respective version of the one or more supporting software applications identified in the text file and required to be included in the development environment;
determining a first set of one or more ports used to access the supporting software applications within the development environment at the development machine level;
identifying a second set of ports on the development machine;
correlating the second set of ports on the development machine with the first set of one or more ports used to access the supporting software applications within the development environment at the development machine level;
modifying a set of configuration files associated with the supporting software applications based on the correlation between the second set of ports and first set of one or more ports;
building a container containing the respective version of the software application to be developed and the respective supporting technology stack including the respective version of one or more supporting software applications to create the development environment; and
binding the second set of ports to the created container.

12. The method of claim 11, wherein the first set of one or more ports are default ports used by the respective versions of the one or more supporting software applications of each of the respective containers, and are the same on each of the respective containers.

13. The method of claim 12, wherein identifying the second set of ports comprises reading a file containing a list of ports that have been reserved for use by other containers; and
determining a first set of free ports that have not been reserved for use by other containers.

14. The method of claim 13, wherein identifying the second set of ports further comprises:
attempting to connect to the determined first set of free ports on the development machine; and
setting the second set of ports to be the determined first set of free ports when the attempt to connect to the determined first set of free ports is successful.

15. The method of claim 14, further comprising updating the file containing the list of ports that have been reserved by other containers with information identifying the second set of ports.

16. The method of claim 14, further comprising determining a second set of free ports that have not been reserved for use by other containers when the attempt to connect to the determined first set of free ports is not successful.

17. The method of claim 11, wherein locating and downloading the respective version of the one or more supporting software applications identified in the text file and required to be included in the development environment comprises determining whether the respective version of the one or more supporting software applications is stored locally on the development machine.

18. The method of claim 17, wherein, in response to a determination that respective version of the one or more supporting software applications is not stored locally on the development machine, the method further comprising:

automatically searching for respective version of the one or more supporting software applications on a REST API of a software repository; and downloading the respective version of the one or more supporting software applications from the software repository.

19. The method of claim 11, wherein binding the second set of ports to the created container comprises publishing the second set of ports from the container to the development machine.

20. The method of claim 11, further comprising retrieving source code of the respective version of the software application to be developed from a software repository that is to be modified in the development environment; and including the source code in the container.

* * * * *